(12) United States Patent
Ishii et al.

(10) Patent No.: US 12,494,349 B2
(45) Date of Patent: Dec. 9, 2025

(54) MEMBER, MANUFACTURING METHOD OF MEMBER AND SUBSTRATE PROCESSING APPARATUS

(71) Applicant: Tokyo Electron Limited, Tokyo (JP)

(72) Inventors: Takayuki Ishii, Miyagi (JP); Kazuya Nagaseki, Miyagi (JP); Michishige Saito, Miyagi (JP); Shota Kaneko, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 348 days.

(21) Appl. No.: 17/066,586

(22) Filed: Oct. 9, 2020

(65) Prior Publication Data

US 2021/0111005 A1     Apr. 15, 2021

(30) Foreign Application Priority Data

Oct. 15, 2019 (JP) .................. 2019-188853

(51) Int. Cl.
| | |
|---|---|
| *B22F 10/28* | (2021.01) |
| *B23K 26/354* | (2014.01) |
| *B33Y 10/00* | (2015.01) |
| *B33Y 70/00* | (2020.01) |
| *B33Y 80/00* | (2015.01) |
| *H01J 37/32* | (2006.01) |
| *B22F 10/62* | (2021.01) |
| *B22F 10/64* | (2021.01) |
| *B22F 12/44* | (2021.01) |
| *B22F 12/49* | (2021.01) |

(Continued)

(52) U.S. Cl.
CPC .......... *H01J 37/3255* (2013.01); *B22F 10/28* (2021.01); *B23K 26/354* (2015.10); *B33Y 10/00* (2014.12); *B33Y 70/00* (2014.12); *B33Y 80/00* (2014.12); *H01J 37/32467* (2013.01); *H01J 37/32495* (2013.01); *H01J 37/32559* (2013.01); *H01J 37/32633* (2013.01); *H01J 37/32651* (2013.01); *B22F 10/62* (2021.01); *B22F 10/64* (2021.01); *B22F 12/44* (2021.01); *B22F 12/49* (2021.01); *B22F 12/67* (2021.01); *B22F 2301/052* (2013.01); *B33Y 30/00* (2014.12); *G02B 26/101* (2013.01)

(58) Field of Classification Search
CPC ...................................................... B22F 10/28
See application file for complete search history.

(56) References Cited

U.S. PATENT DOCUMENTS

| | | | |
|---|---|---|---|
| 2016/0233060 A1* | 8/2016 | Narendrnath | B33Y 10/00 |
| 2019/0291182 A1* | 9/2019 | Bobel | B33Y 70/00 |
| 2019/0309402 A1* | 10/2019 | Karabin | C22C 21/02 |

FOREIGN PATENT DOCUMENTS

| | | |
|---|---|---|
| JP | H07-278713 A | 10/1995 |
| JP | 2007-260624 A | 10/2007 |

(Continued)

OTHER PUBLICATIONS

Jude Mary Runge, Anodizing ASM Handbook, vol. 2A, Aluminum Science and Technology, Kevin Anderson, John Weritz, and J. Gilbert Kaufman, editors, 2018, pp. 590-605.*

*Primary Examiner* — Christopher S Kessler
(74) *Attorney, Agent, or Firm* — XSENSUS LLP (57) ABSTRACT

A member to be used in a substrate processing apparatus is provided. The member is formed of aluminum containing silicon, and the silicon has a particle diameter of 1 μm or less.

10 Claims, 6 Drawing Sheets

(51) Int. Cl.
*B22F 12/67* (2021.01)
*B33Y 30/00* (2015.01)
*G02B 26/10* (2006.01)

(56) References Cited

FOREIGN PATENT DOCUMENTS

| | | |
|---|---|---|
| JP | 2015-067902 A | 4/2015 |
| JP | 2016-081158 A | 5/2016 |
| KR | 10-2017-0115816 A | 10/2017 |

* cited by examiner

MEMBER, MANUFACTURING METHOD OF MEMBER AND SUBSTRATE PROCESSING APPARATUS

CROSS-REFERENCE TO RELATED APPLICATION

This application claims the benefit of Japanese Patent Application No. 2019-188853 filed on Oct. 15, 2019, the entire disclosures of which are incorporated herein by reference.

TECHNICAL FIELD

The exemplary embodiments described herein pertain generally to a member, a manufacturing method of the member and a substrate processing apparatus.

BACKGROUND

For example, Patent Document 1 proposes casting a component member of a vacuum vessel in a vacuum apparatus whose interior is set to be a vacuum atmosphere for carrying out a predetermined processing on a target object or for transferring the target object with an aluminum material having a Si content of 4% to 6%. A surface of the vacuum vessel is coated with an alumite film.

Patent Document 1: Japanese Patent Laid-open Publication No. 2007-260624

SUMMARY

In one exemplary embodiment, a member to be used in a substrate processing apparatus is provided. The member is formed of aluminum containing silicon, and the silicon has a particle diameter of 1 µm or less.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

BRIEF DESCRIPTION OF THE DRAWINGS

In the detailed description that follows, exemplary embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other exemplary embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, various exemplary embodiments of the present disclosure will be described with reference to the accompanying drawings. In the drawings, same or corresponding parts will be assigned same or corresponding reference numerals, and redundant description may be omitted.

[Configuration of 3D Printer]

Figure 1:
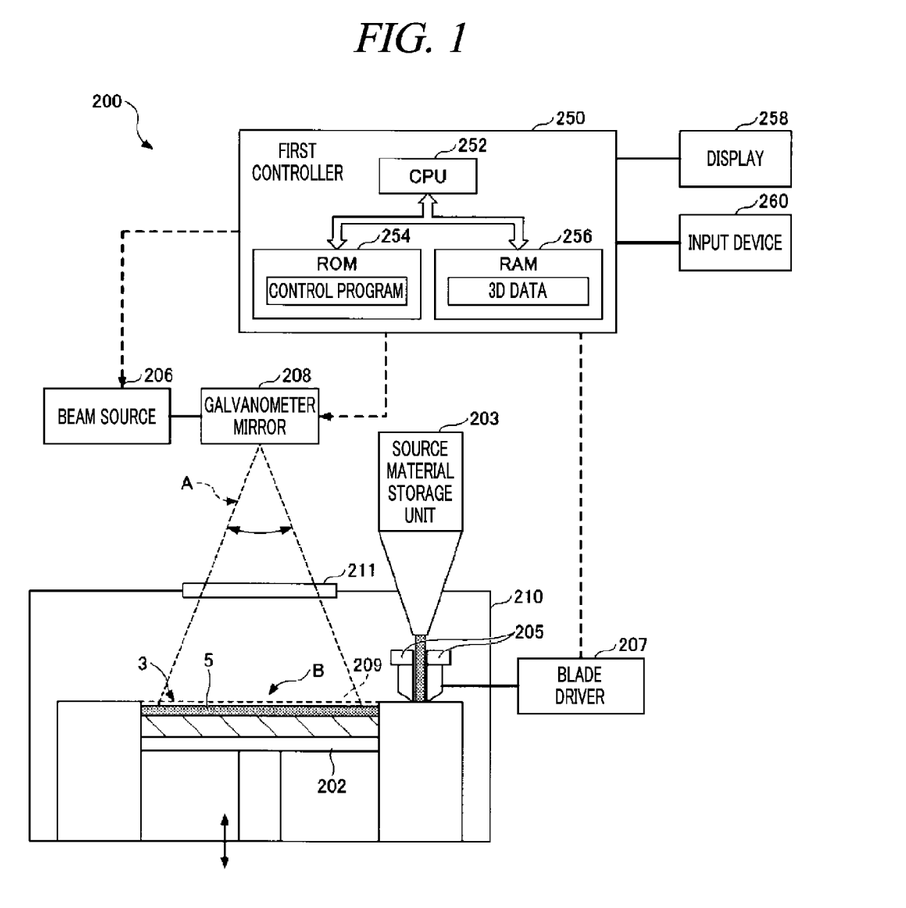
FIG. 1 is a diagram illustrating an example of a configuration of a three-dimensional (hereinafter, referred to as "3D") printer according to an exemplary embodiment.

First, an example of a configuration of a 3D printer 200 configured to perform a manufacturing method of a member to be used in a substrate processing apparatus according to an exemplary embodiment will be described with reference to FIG. 1. FIG. 1 is a diagram illustrating the example of the configuration of the 3D printer 200 according to the exemplary embodiment. The 3D printer 200 is an example of a device configured to form (manufacture) the member to be used in the substrate processing apparatus. The substrate processing apparatus is a device configured to process a substrate with plasma or heat.

However, the 3D printer 200 illustrated in FIG. 1 is an example of the device configured to manufacture the member to be used in the substrate processing apparatus, but the device configured to manufacture the member is not limited to the 3D printer. Also, examples of the member to be used in the substrate processing apparatus may include a chamber, a placing table on which a substrate is placed, an upper electrode, a baffle plate and a shield which are examples of components included in the substrate processing apparatus to be described below (see FIG. 7).

The 3D printer 200 is configured to form a 3D structure to be used as the member in the substrate processing apparatus. The 3D printer 200 stores 3D data for forming the 3D structure in a storage such as a RAM 256 and manufactures the structure based on the 3D data. The structure is formed on a stage 202 provided on a table. The stage 202 can move up and down so that, for example, it can slowly move down as the structure is manufactured.

Two sheets of blades 205 are provided apart from each other on the table within a chamber 210. A source material storage unit 203 is placed above the two sheets of blades 205 as an upper part of the chamber 210. The source material storage unit 203 stores therein a source material for forming the structure, i.e., a material powder of aluminum containing silicon (aluminum alloy). The aluminum containing silicon is not limited to a powder shape, but may be in the form of wire. The source material is supplied between the two sheets of blades 205 from the source material storage unit 203. The supplied source material is formed into the powder shape by using the two sheets of blades 205 which are driven by a blade driver 207. A predetermined amount of the source material powder (hereinafter, referred to as "material powder 5") is supplied into a laser beam scanning space 209. FIG. 1 illustrates a status where the laser beam scanning space 209 on the table is coated with the material powder 5.

Thus, when the material powder 5 of the aluminum containing silicon (the silicon-containing aluminum material powder 5) is supplied, an energy beam is irradiated to melt the material powder 5. In the present exemplary embodiment, a laser beam A (optical laser) is used as the energy beam to be irradiated.

The laser beam A is output from a beam source 206 and an irradiation angle of the laser beam A is changed by a galvanometer mirror 208 to be irradiated to a predetermined position in an irradiation area on the stage 202 via a laser transmission window 211. Desirably, the beam source 206 and the galvanometer mirror 208 are placed outside the chamber 210.

Accordingly, it is possible to scan the laser beam A in at least two-dimensional (XY) directions on the stage 202. For example, the galvanometer mirror 208 is controlled to move an irradiation spot of the laser beam A on the stage 202 according to the 3D data representing a 3D shape of the structure. Specifically, a first controller 250 is configured to control the galvanometer mirror 208 to change the irradiation angle of the laser beam A and then scan the laser beam A in the two-dimensional (XY) directions as the structure is formed. The laser beam A melts the silicon-containing aluminum material powder on the stage 202. Then, the material powder is cooled and solidified to form the structure.

Also, desirably, a temperature of the source material storage unit 203 is adjusted by a heating device. Further, desirably, the chamber 210 is equipped with a mechanism configured to supply an inert gas and exhaust a gas inside the chamber 210.

The first controller 250 includes a CPU 252, a ROM 254 and a RAM 256. The first controller 250 performs a supply control of the source material powder from the source material storage unit 203 and an elevation control of the stage 202. Further, the first controller 250 performs a turning on and off control of the beam source 206 and a change control of the laser irradiation angle by the galvanometer mirror 208. Thus, the first controller 250 sequentially performs a process of supplying the silicon-containing aluminum material powder, a process of melting the material powder and a process of cooling the melted material powder once or a plurality of times. As a result, a structure 3 of the member to be used in the substrate processing apparatus is manufactured.

A control program executed by the CPU 252 is stored, for example, in the ROM 254. The CPU 252 executes the control program based on, for example, the 3D data stored in the RAM 256 to control the manufacture of the structure 3. Further, the control program may be stored in a static storage medium or may be stored in various detachable and computer-readable storage medium such as a flash memory or an optical (magnetic) disk.

Further, the first controller 250 includes a display 258 and an input device 260 such as a keyboard or a pointing device. The display 258 is used to display a progress status of the manufacture of the structure 3. The input device 260 is used to input commands to start and stop an operation of the 3D printer 200 or control parameters.

The 3D data is stored in a memory unit such as the RAM 256. The 3D data include data for forming the structure 3 to be used as a member in the substrate processing apparatus by using the material powder containing silicon at a predetermined content ratio.

[Manufacturing Method of Member]

Figure 2:
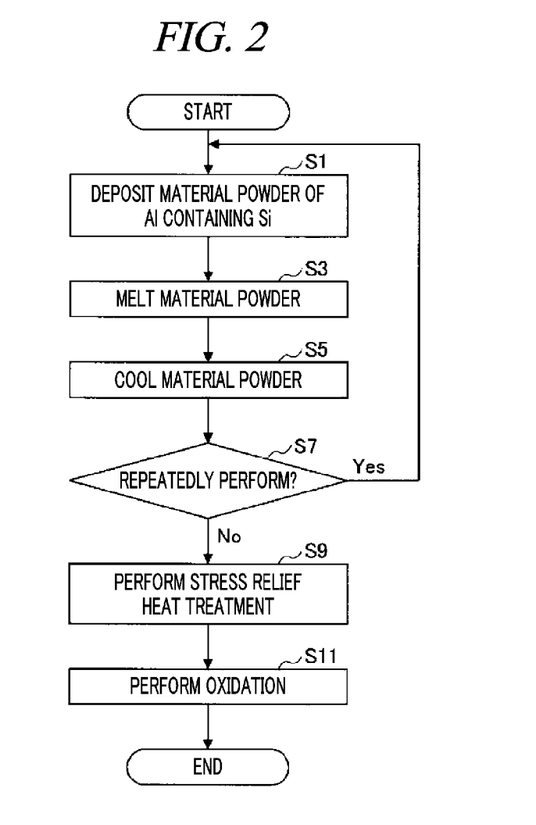
FIG. 2 shows an example of a manufacturing method of a member to be used in a substrate processing apparatus according to the exemplary embodiment.
Figure 3A:
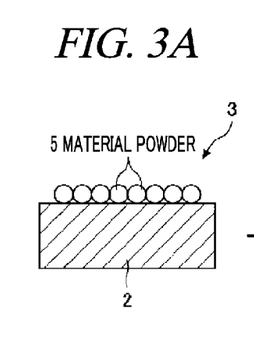
FIG. 3A to FIG. 3F are provided to explain the manufacturing method shown in FIG. 2.
Figure 3B:
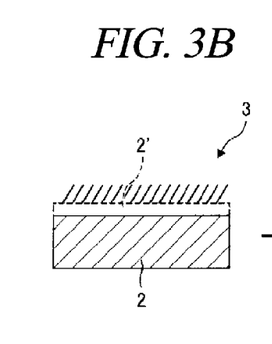
Figure 3C:
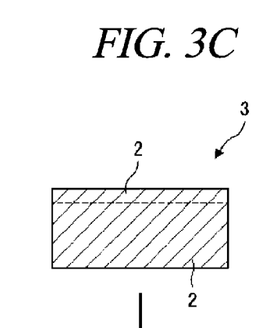
Figure 3D:
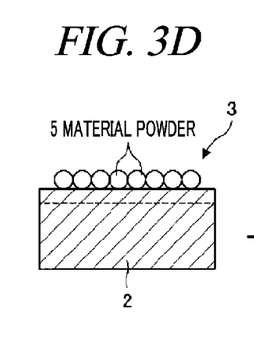
Figure 3E:
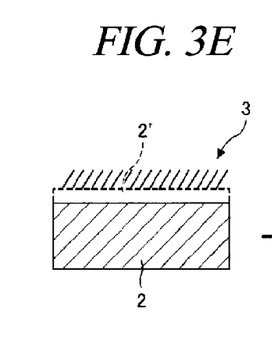
Figure 3F:
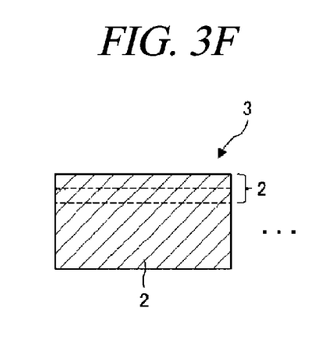

Hereinafter, an example of a manufacturing method of the member to be used in the substrate processing apparatus will be described with reference to FIG. 2 to FIG. 3F. FIG. 2 shows an example of a manufacturing method of the member to be used in the substrate processing apparatus according to the exemplary embodiment. FIG. 3A to FIG. 3F are provided to explain the manufacturing method of the member to be used in the substrate processing apparatus according to the exemplary embodiment shown in FIG. 2.

Processes S1 to S7 shown in FIG. 2 are performed by the 3D printer 200. A process S9 is performed by a non-illustrated furnace. A process S11 is performed by a non-illustrated device configured to perform anodic oxidation.

When the present processing is started, the first controller 250 obtains the 3D data stored in the RAM 256 and supplies the silicon-containing aluminum material powder 5 to the laser beam scanning space 209 based on the 3D data to deposit the silicon-containing aluminum material powder 5 (process S1). In this case, the first controller 250 controls the blade driver 207 to operate the blades 205 and supplies the material powder 5, which has been supplied as the source material between the blades 205 from the source material storage unit 203 and formed into powder, to the laser beam scanning space 209. For example, the silicon-containing aluminum material powder 5 is deposited on a base 2 as illustrated in FIG. 3A. The base 2 may be formed of the same material as or a different material from the material powder 5.

Then, the first controller 250 irradiates the laser beam A to the deposited material powder 5 to melt the material powder 5 (process S3). In this case, the first controller 250 controls the laser irradiation angle by the galvanometer mirror 208 and irradiates the laser beam A to the material powder 5 to melt the material powder 5. Thus, as illustrated in FIG. 3B, the material powder 5 is melted on the base 2 or melted together with a part of the surface of the base 2 (indicated by 2' in FIG. 3B).

Then, the first controller 250 cools the melted material powder (process S5). Desirably, the material powder is cooled by rapid solidification that requires 1 second or less for solidification, but may be cooled by natural cooling or by both the rapid solidification and the natural cooling. Thus, as illustrated in FIG. 3C, the silicon-containing aluminum material powder 5 is solidified to be integrated with the base 2.

Then, in FIG. 2, the first controller 250 determines whether or not to repeatedly perform the processes S1 to S5 (process S7). The number of repetition of the processes S1 to S5 is previously determined depending on the thickness of the structure 3 and the thickness (for example, 90 μm) of the material powder 5 melted and solidified by performing the processes once.

If the first controller 250 determines to repeat the processes, the processing returns to the process S1, and the processes S1 to S7 are repeatedly performed. In this way, the operations shown in FIG. 3D to FIG. 3F including the supplying of the material powder 5, the melting of the material powder 5 with the laser beam and further the solidifying of the material powder 5 are repeatedly performed to complete the manufacture of the 3D structure 3.

In the process S7 of FIG. 2, if the first controller 250 determines not to repeat the processes, the structure 3 is transferred into a furnace in which a stress relief heat treatment is performed, and then, thermal stress in the structure 3 is removed within the furnace. Thus, distortion of the inside of the structure 3 can be resolved. Also, the process S9 may be omitted.

Then, the structure 3 is transferred from the furnace into the device in which the anodic oxidation is performed, and then, the surface of the structure 3 is oxidized within the device (process S11). For example, the surface of the structure 3 which is made of aluminum is anodically oxidized (alumite treated) to form an oxide film of alumina ($Al_2O_3$) on the surface. Further, the oxidation in the process S11 may include natural oxidation in which the structure 3 is allowed to be exposed to the atmosphere. Also, the process S11 may be omitted.

According to the above-described manufacturing method of the member, the particle diameter of the silicon contained in the aluminum material forming the structure 3 may be set to 1 μm or less. Thus, by improving the uniformity of the oxide film coating the aluminum material, corrosion resistance and insulating property of the member to be used in the substrate processing apparatus can be improved. Also, it is possible to manufacture the member which is solid and resistant to wear.

[Test Result]

Figure 4A:
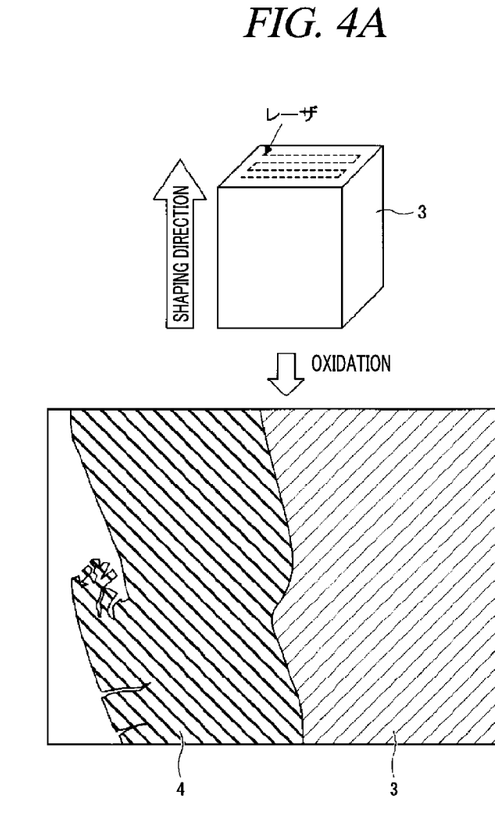
FIG. 4A and FIG. 4B show a comparison between the member formed by the manufacturing method according to an exemplary embodiment and a comparative example.
Figure 4B:
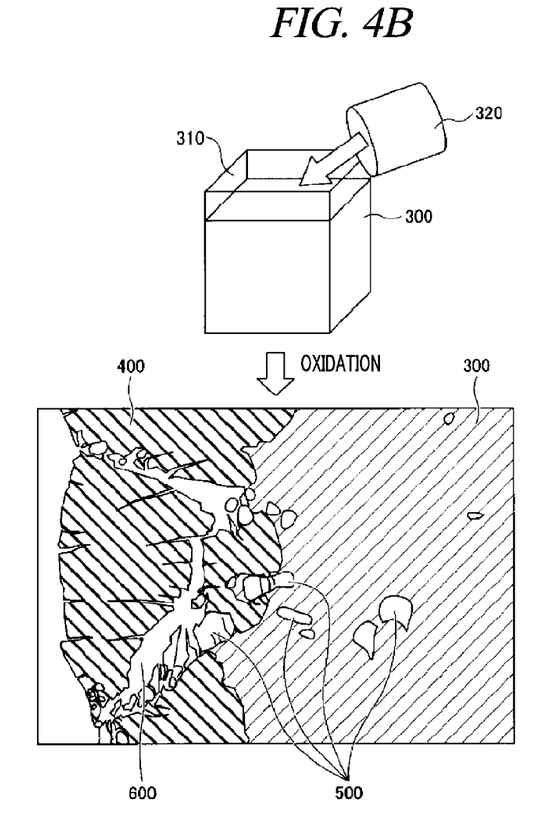

A status of the structure 3 formed of aluminum by the 3D printer 200 and an alumina of an oxide film 4 obtained by anodically oxidizing the surface of the structure 3 will be described with reference to FIG. 4A and FIG. 4B. FIG. 4A illustrates a status of the structure 3 formed of aluminum by the 3D printer 200 and the alumina of the oxide film 4 obtained by anodically oxidizing the surface of the structure 3 as illustrated in FIG. 2 to FIG. 3F. FIG. 4B illustrates a status of an aluminum cast 300 formed by allowing a melted (molten) aluminum metal 320 to flow into a mold 310 by aluminum casting technique and an alumina of an oxide film 400 obtained by anodically oxidizing the surface of the cast 300 as a comparative example.

In the flow of the molten aluminum metal 320 in the mold 310, a temperature of the molten aluminum metal 320 is decreased due to thermal conduction from the molten aluminum metal 320 to the mold 310 during the flow, so that the molten aluminum metal 320 is started to be solidified and the flow of the molten aluminum metal 320 may be stopped before the mold 310 is fully filled with the molten metal 320. To facilitate the flow of the molten aluminum metal 320 and avoid the stopping of the flow of the molten metal 320, silicon is contained in the molten metal 320.

However, as illustrated in a lower part of FIG. 4B, when the surface of the aluminum cast 300 obtained by solidifying the molten metal 320 is anodically oxidized, silicon 500 in the aluminum inhibits the growth of the oxide film 400, and, thus, a crack 600 may be generated in the oxide film 400.

The silicon 500 added to the aluminum cast 300 has coarse particles having a particle diameter of about 10 μm. For this reason, the particles of the silicon 500 inhibit the uniform growth of the oxide film 400. Therefore, as illustrated in FIG. 4B, the crack 600 reaching the aluminum is generated in the oxide film 400.

As a result, if the oxide film 400 of alumina is formed on the surface of the aluminum cast 300, non-uniform growth of the oxide film 400 may cause a decrease in withstand voltage, dusting properties, deterioration in sealing properties and burning caused by an overcurrent to the aluminum cast 300. That is, if a member in which the oxide film 400 of alumina is formed on the surface of the cast 300 is used in the substrate processing apparatus, the quality of substrate processing may deteriorate.

Meanwhile, if the silicon is not added to the molten aluminum metal 320, the flow of the molten aluminum metal 320 deteriorates, which may cause defects, such as pores, or deformation of the aluminum cast 300. For this reason, it is necessary to add silicon to aluminum in the manufacture. Also, in order to improve the fluidity of aluminum in the 3D printer 200, aluminum needs to contain silicon at a predetermined content ratio. Both the structure shown in FIG. 4A and the cast shown in FIG. 4B have a content ratio of silicon in aluminum in the range of from 9% to 11%. Further, the content ratio of silicon in aluminum is not limited thereto, but may be in a different range.

The lower part of FIG. 4A illustrates a status of the structure 3 formed of aluminum by the 3D printer 200 and the oxide film 4 of alumina obtained by anodically oxidizing the surface of the structure 3. In the manufacturing method of the member according to the present exemplary embodiment, the aluminum structure 3 is formed by the 3D printer 200, and, thus, the particle diameter of the silicon contained in the aluminum can be set to 1 μm or less. Further, such a small particle diameter of the silicon is not illustrated in FIG. 4A.

If the silicon has the particle diameter of 1 μm or less, the silicon does not inhibit the growth of the oxide film 4. Therefore, as shown in FIG. 4A, the oxide film 4 is uniformly grown and no crack is generated in the oxide film 4.

It can be seen that as for the oxide film 4 of alumina obtained by anodically oxidizing the surface of the aluminum structure 3, even if the aluminum contains the silicon at a high content ratio of about 10%, the oxide film 4 is uniform and does not have any crack. Also, it can be seen that the aluminum structure 3 does not have the coarse silicon particles having the particle diameter of about 10 μm unlike the aluminum cast 300 and the silicon contained in the aluminum structure 3 is finely dispersed to be precipitated therein.

This is because in the manufacturing method of the structure 3 using the 3D printer 200, the rapid solidification is carried out as the cooling processing shown in the process S5 of FIG. 2, and, thus, the silicon has the particle diameter of 1 μm or less and is finely dispersed to be precipitated in the aluminum structure 3. Accordingly, it is found out that when a solidification rate of the aluminum containing silicon is increased to finely disperse and precipitate the silicon particles, the silicon particles do not inhibit the growth of the oxide film 4 during the anodic oxidation and the oxide film 4 without the large crack reaching the aluminum can be formed. Also, it is possible to obtain an excellent fluidity of aluminum by adding the silicon to the aluminum.

Meanwhile, according to the conventional casting, when the cast shown in FIG. 4B is manufactured, it is slowly solidified. For this reason, the silicon has the particle diameter of about 10 μm. Therefore, the quality of the oxide film 400 deteriorates due to the silicon having the large particle diameter.

[Corrosion Resistance]

Figure 5A:
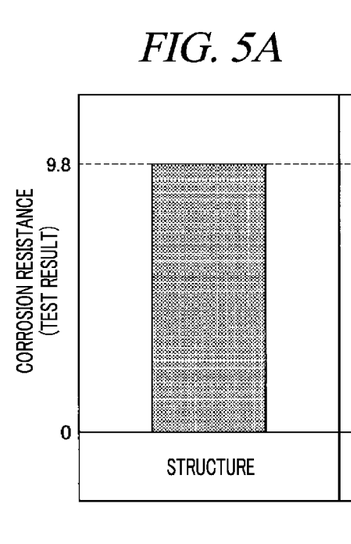
FIG. 5A and FIG. 5B show a comparison between corrosion resistances of the member formed by the manufacturing method according to an exemplary embodiment and the comparative example.
Figure 5B:
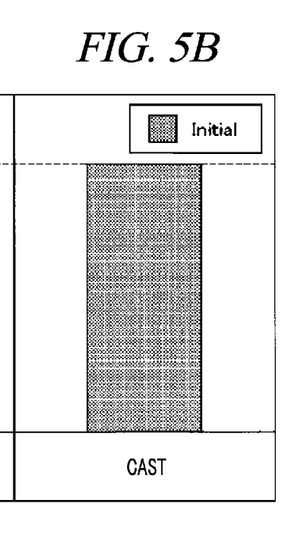

FIG. 5A shows an example of a corrosion resistance test result of the structure 3 which is formed of aluminum by the 3D printer 200 and coated with the oxide film 4 by anodically oxidizing the surface of the structure 3. FIG. 5B shows an example of a corrosion resistance test result of the aluminum cast 300 which is manufactured by the casting technique and coated with the oxide film 400 by anodically oxidizing the surface of the cast 300. Herein, "initial" represents the corrosion resistance test results of the structure 3 and the cast 300 in an initial state (25° C.). According to the test results, it can be seen that the structure 3 shown in FIG. 5A and the cast 300 shown in FIG. 5B are similar in the corrosion resistance to each other. That is, the structure 3 manufactured by using the 3D printer 200 has a plasma resistance equivalent to that of the cast 300 manufactured by using the mold.

In the present test, a rating number method is employed as a method for the corrosion resistance test. The rating number method refers to a method in which the size (i.e., area) and the number of corrosion defects in a test piece after a test are compared by standard drawing and visual observation, and when a coincidence therebetween is observed, a number in the corresponding standard drawing is determined as a rating number of the test piece. The rating number does not have a particular unit and ranges from 0 to 10. As a value classified by a pitting (corrosion) area ratio increases, the corrosion resistance increases. The rating number "9.8" on the longitudinal axis of FIG. 5A and FIG. 5B means that the pitting area ratio (%) is 0.02 or less and the corrosion resistance is as high as that of the cast 300 shown in FIG. 5B.

[Insulating Property]

Figure 6A:
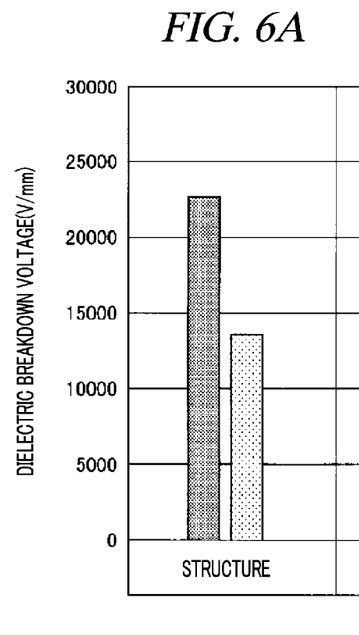
FIG. 6A and FIG. 6B show a comparison between insulating properties of the member formed by the manufacturing method according to an exemplary embodiment and the comparative example.
Figure 6B:
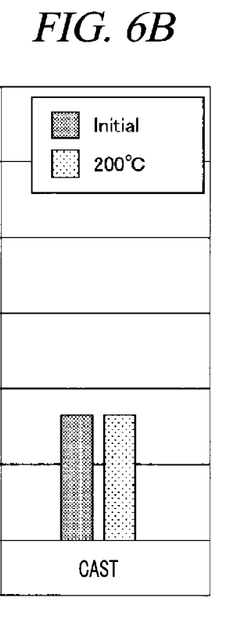

FIG. 6A shows an example of an insulating property test result of the structure 3 which is formed of aluminum by the 3D printer 200 and coated with the oxide film 4 by anodically oxidizing the surface of the structure 3. FIG. 6B shows an example of an insulating property test result of the aluminum cast 300 which is manufactured by the casting technique and coated with the oxide film 400 by anodically oxidizing the surface of the cast 300. As a dielectric breakdown voltage (V/mm) increases, the insulating property increases. Herein, "initial" represents the insulating property test results of the structure 3 and the cast 300 in an initial state (25° C.). Also, "200° C." represents the insulating property test results of the structure 3 and the cast 300 after being heated to 200° C.

According to the test results, it can be seen that in both cases of "initial" and "200° C.", the structure 3 shown in FIG. 6A has a higher insulating property than the cast 300 shown in FIG. 6B. For this reason, it is important to finely disperse the silicon particles in the aluminum by increasing the cooling rate to reduce the solidification time in the process S5 of FIG. 2. Thus, there is no region where the oxide film 4 cannot be grown. Therefore, it is possible to suppress the generation of the crack, which reaches the underlying aluminum, in the oxide film 4.

In the structure 3 shown in FIG. 6A, the silicon has the small particle diameter of from about 10 μm equivalent to that of the conventional cast to 1 μm. Thus, it is possible to obtain the uniform oxide film 4 as shown in FIG. 4A even in the aluminum structure 3 containing the silicon at the content ratio of about 10%. Therefore, the oxide film 4 without the crack can be formed even in the manufacture at room temperature. Thus, the withstand voltage can be improved compared to the conventional cast. Also, as the solidification rate of the aluminum increases, crystal grains of the aluminum decrease in size. Therefore, it is possible to reduce the variation in the color tone and the film thickness in appearance.

Further, it can be seen that when the structure 3 shown in FIG. 6A increases in temperature from the initial state (room temperature: 25° C.) to 200° C., the insulating property of the structure 3 deteriorates compared to the initial state. This may be because the oxide film 4 of alumina has a smaller linear expansion than aluminum of the base, and is likely to be cracked when a tensile stress is applied to the film due to the change in temperature. As a result, as the temperature of the structure 3 increases, the insulating property decreases.

Further, in the manufacturing method according to the present exemplary embodiment, the 3D printer 200 capable of rapidly solidifying the structure 3 is used in order for the silicon contained in the aluminum structure 3 to have the particle diameter of 1 μm or less. However, the device configured to form the member is not limited to the 3D printer 200 as long as silicon contained in an aluminum member can have a particle diameter of 1 μm or less.

Furthermore, when the aluminum material powder is melted and solidified with the laser beam in the 3D printer 200, a shaping direction may be perpendicular or parallel to a finished structure.

[Plasma Processing Apparatus]

Figure 7:
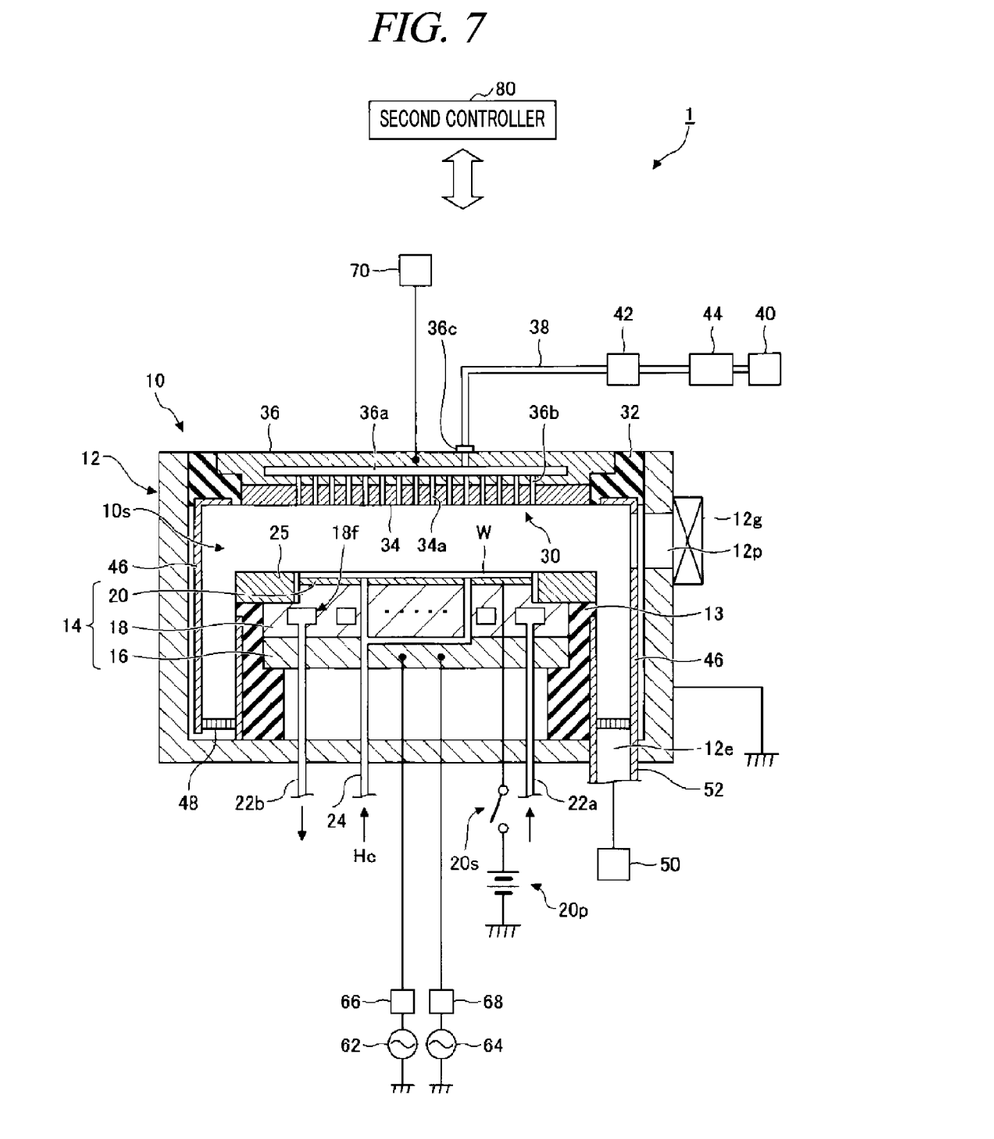
FIG. 7 is a diagram illustrating an example of the configuration of a substrate processing apparatus according to an exemplary embodiment.

Finally, an example of the substrate processing apparatus in which the member to be used in the substrate processing apparatus according to the exemplary embodiment is used will be described with reference to FIG. 7. FIG. 7 is a diagram illustrating an example of the configuration of the substrate processing apparatus according to the exemplary embodiment. A plasma processing apparatus 1 shown in FIG. 7 is a capacitively-coupled plasma processing apparatus which is the example of the substrate processing apparatus.

The plasma processing apparatus 1 includes a chamber 10. The chamber 10 provides an inner space 10s therein. The chamber 10 includes a chamber main body 12. The chamber main body 12 has a substantially cylindrical shape. The inner space 10s is formed within the chamber main body 12. The chamber main body 12 is formed of, for example, aluminum. A film having corrosion resistance is provided on an inner wall surface of the chamber main body 12. The film having corrosion resistance may be an oxide film which is formed of ceramic such as alumina (aluminum oxide) or yttrium oxide and anodically oxidized.

A passage 12p is formed at a sidewall of the chamber main body 12. A substrate W passes through the passage 12p when transferred between the inner space 10s and the outside of the chamber 10. The passage 12p can be opened/closed by a gate valve 12g. The gate valve 12g is provided along the sidewall of the chamber main body 12.

A support 13 is provided on a bottom portion of the chamber main body 12. The support 13 is formed of an insulating material. The support 13 has a substantially cylindrical shape. The support 13 is extended upwards from the bottom portion of the chamber main body 12 in the inner space 10s. An edge ring 25 (also referred to as "focus ring") surrounding the substrate is provided on the support 13. The edge ring 25 has a substantially cylindrical shape and may be formed of silicon or the like.

The plasma processing apparatus 1 further includes a placing table 14. The placing table 14 is supported by the support 13. The placing table 14 is provided in the inner space 10s. The placing table 14 is configured to support the substrate W in the chamber 10, i.e., in the inner space 10s.

The placing table 14 includes a lower electrode 18 and an electrostatic chuck 20 according to the exemplary embodiment. The placing table 14 may further include an electrode plate 16. The electrode plate 16 is formed of a conductor such as aluminum and has a substantially disk shape. The lower electrode 18 is provided on the electrode plate 16. The lower electrode 18 is formed of a conductor such as aluminum and has a substantially disk shape. The lower electrode 18 is electrically connected to the electrode plate 16. An outer circumference surface of the lower electrode 18 and an outer circumference surface of the electrode plate 16 are surrounded by the support 13.

The electrostatic chuck 20 is provided on the lower electrode 18. An electrode of the electrostatic chuck 20 is connected to a DC power supply 20p via a switch 20s. When a voltage from the DC power supply 20p is applied to the electrode of the electrostatic chuck 20, the substrate W is held on the electrostatic chuck 20 by an electrostatic attraction force. The electrostatic chuck 20 supports the substrate W and the edge ring 25. The electrode plate 16 and the lower electrode 18 are an example of a base for supporting the electrostatic chuck 20.

A flow path 18f is formed within the lower electrode 18. A heat exchange medium (for example, a coolant) is supplied to the flow path 18f from a chiller unit, which is provided outside the chamber 10, through a pipe 22a. The heat exchange medium supplied to the flow path 18f is returned to the chiller unit through a pipe 22b. In the plasma processing apparatus 1, a temperature of the substrate W placed on the electrostatic chuck 20 is adjusted by heat exchange between the heat exchange medium and the lower electrode 18.

The plasma processing apparatus 1 is equipped with a gas supply line 24. The gas supply line 24 supplies a heat transfer gas (for example, He gas) from a heat transfer gas supply mechanism to a gap between an upper surface of the electrostatic chuck 20 and a lower surface of the substrate W.

The plasma processing apparatus 1 further includes an upper electrode 30. The upper electrode 30 is provided above the placing table 14. The upper electrode 30 is supported on an upper portion of the chamber main body 12 via a member 32. The member 32 is formed of a material having an insulation property. The upper electrode 30 and the member 32 close an upper opening in the chamber main body 12.

The upper electrode 30 may include a top plate 34 and a support body 36. A lower surface of the top plate 34 is a lower surface at the inner space 10s side and defines the inner space 10s. The top plate 34 may be formed of a low resistance conductor or semiconductor having low Joule heat. A plurality of gas discharge holes 34a is formed in the top plate 34. The plurality of gas discharge holes 34a penetrates the top plate 34 in a plate thickness direction.

The support body 36 detachably supports the top plate 34. The support body 36 is formed of a conductive material such as aluminum. A gas diffusion chamber 36a is provided within the support body 36. A plurality of gas holes 36b is formed in the support body 36. The gas holes 36b are extended downwards from the gas diffusion chamber 36a. The gas holes 36b communicate with the gas discharge holes 34a, respectively. A gas inlet opening 36c is formed in the support body 36. The gas inlet opening 36c is connected to the gas diffusion chamber 36a. A gas supply pipe 38 is connected to the gas inlet opening 36c.

The gas supply pipe 38 is connected to a gas supply GS including a gas source group 40, a flow rate controller group 44 and a valve group 42. The gas source group 40 is connected to the gas supply pipe 38 via the flow rate controller group 44 and the valve group 42. The gas source group 40 includes a plurality of gas sources. The valve group 42 includes a plurality of opening/closing valves. The flow rate controller group 44 includes a plurality of flow rate controllers. Each of the plurality of flow rate controllers of the flow rate controller group 42 is a mass flow controller or a pressure control type flow controller. Each of the plurality of gas sources of the gas source group 40 is connected to the gas supply pipe 38 via a corresponding flow rate controller of the flow rate controller group 44 and a corresponding opening/closing valve of the valve group 42. A power supply 70 is connected to the upper electrode 30. The power supply 70 applies, to the upper electrode 30, a voltage for attracting positive ions in the inner space 10s to the top plate 34.

In the plasma processing apparatus 1, a shield 46 is detachably provided along the inner wall surface of the chamber main body 12. The shield 46 is also provided on an outer circumference of the support 13. The shield 46 is configured to suppress adhesion of reaction products such as etching byproducts to the chamber main body 12. The shield 46 is configured by forming a film having corrosion resistance on the surface of a member formed of, for example, aluminum. The film having corrosion resistance may be an oxide film formed of alumina or yttrium oxide.

A baffle plate 48 is provided between the support 13 and the sidewall of the chamber main body 12. The baffle plate 48 is configured by forming a film having corrosion resistance on a surface of a member formed of, for example, aluminum. The film having corrosion resistance may be an oxide film formed of alumina or yttrium oxide. A plurality of through-holes is formed in the baffle plate 48. An exhaust port 12e is provided below the baffle plate 48 and in the bottom portion of the chamber main body 12. An exhaust device 50 is connected to the exhaust port 12e via an exhaust pipe 52. The exhaust device 50 includes a vacuum pump such as a pressure control valve and a turbo molecular pump.

The plasma processing apparatus 1 further includes a first high frequency power supply 62 configured to apply a high frequency power HF for plasma formation. The first high frequency power supply 62 is configured to generate the high frequency power HF for plasma formation from a gas within the chamber 10. A frequency of the high frequency power HF is in the range of, for example, from 27 MHz to 100 MHz.

The first high frequency power supply 62 is connected to the lower electrode 18 via a matching device 66. The matching device 66 includes a matching circuit. The matching circuit of the matching device 66 is configured to match an output impedance of the first high frequency power supply 62 with an impedance at the load side (lower electrode side) of the first high frequency power supply 62. In another exemplary embodiment, the first high frequency power supply 62 may be electrically connected to the upper electrode 30 via the matching device 66.

The plasma processing apparatus 1 may further include a second high frequency power supply 64 configured to apply a high frequency power LF for ion attraction. The second high frequency power supply 64 is configured to generate the high frequency power LF. The high frequency power LF has a frequency suitable for mainly attracting ions to the substrate W and has a frequency in the range of, for example, from 400 kHz to 13.56 MHz. Otherwise, the high frequency power LF may be a pulse-shaped voltage having a rectangular waveform.

The second high frequency power supply 64 is electrically connected to the lower electrode 18 via a matching device 68. The matching device 68 include a matching circuit. The matching circuit of the matching device 68 is configured to match an output impedance of the second high frequency power supply 64 with an impedance at a load side (lower electrode side) of the second high frequency power supply 64.

The plasma processing apparatus 1 may further include a second controller 80. The second controller 80 may be a computer including a processor, a storage unit such as a memory, an input device, a display device, a signal input/output interface and the like. The second controller 80 controls each unit of the plasma processing apparatus 1. An operator may perform, for example, a command input operation for managing the plasma processing apparatus 1 using the input device of the second controller 80. In addition, the second controller 80 may visualize and display an operation status of the plasma processing apparatus 1 using the display device. Moreover, control programs and recipe data are stored in the storage unit of the second controller 80. The control programs are executed by the processor of the second controller 80 in order to execute various processings in the plasma processing apparatus 1. When the processor of the second controller 80 executes the control programs to control each unit of the plasma processing apparatus 1 according to the recipe data, various processes such as a plasma processing method are executed in the plasma processing apparatus 1.

In the plasma processing apparatus 1 configured as described above, examples of the member to be used in the substrate processing apparatus (the plasma processing apparatus 1) may include the chamber 10, the upper electrode 30, the shield 46, the baffle plate 48 and the like. However, the member to be used in the substrate processing apparatus is not limited thereto and may be a member to be exposed to plasma within the chamber 10.

It should be understood that the member, the manufacturing method of a member and the substrate processing apparatus according to an exemplary embodiment of the present disclosure are illustrative in all aspects and do not limit the present disclosure. The above-described exemplary embodiments can be variously changed and modified without departing from the scope and spirit of the present disclosure. The contents described in the above-described exemplary embodiments can be implemented in other embodiments without contradicting each other and can be combined without contradicting each other.

Although the plasma processing apparatus has been described as the example of the substrate processing apparatus, the substrate processing apparatus is not limited to the plasma processing apparatus as long as it can perform a predetermined processing (for example, film formation, etching or the like) to a substrate.

Also, the substrate processing apparatus may be an etching apparatus, a film forming apparatus, an aching apparatus, a doping apparatus or the like. For example, the substrate processing apparatus may be a film forming apparatus configured to form an ITO film by sputtering or a metal-containing film by MOCVD.

The substrate processing apparatus of the present disclosure is applicable to any type of an atomic layer deposition (ALD) apparatus, a capacitively coupled plasma (CCP) apparatus, an inductively coupled plasma (ICP) apparatus, a radial line slot antenna (RLSA) apparatus, an electron cyclotron resonance plasma (ECR) apparatus, and a helicon wave plasma (HWP) apparatus.

According to the exemplary embodiments, the uniformity of the oxide film coating the aluminum material containing the silicon can be improved.

From the foregoing, it will be appreciated that various exemplary embodiments of the present disclosure have been described herein for purposes of illustration and various changes can be made without departing from the scope and spirit of the present disclosure. Accordingly, various exemplary embodiments described herein are not intended to be limiting, and the true scope and spirit are indicated by the following claims.

We claim:

1. A manufacturing method of an aluminum member containing silicon particles to be used in a substrate processing apparatus, comprising:
   (a) supplying material powder of aluminum containing silicon based on 3D data and depositing the material powder on a base, wherein a content ratio of silicon in aluminum ranges from 9% to 11%;
   (b) melting the supplied material powder on the base with a laser beam by controlling a galvanometer mirror to adjust an irradiation angle of the laser beam;
   (c) cooling the melted material powder by rapid solidification;
   (d) determining whether or not to repeatedly perform (a), (b) and (c); and
   (e) in (d), if it is determined not to repeatedly perform (a), (b) and (c), performing an anodic oxidation of the aluminum member,
   wherein in (c), the cooling by the rapid solidification is performed for 1 second or less,
   wherein step (a) includes:
      supplying the material powder of aluminum containing silicon from a source material storage unit to a space between two sheets of blades; and
      driving, by a blade driver, the two sheets of blades to supply the material powder of aluminum containing silicon on the base, and
   wherein in step (b), the laser beam passes through the galvanometer mirror, then passes through a laser transmission window and then irradiates the supplied material powder to melt the supplied material powder.

2. The manufacturing method of claim 1, further comprising: performing a heat treatment of the aluminum member.

3. The manufacturing method of claim 1, wherein in (d), when it is determined that the repetition is to be performed, the method further comprises repeating (a), (b) and (c).

4. The manufacturing method of claim 2, wherein in (d), when it is determined that the repetition is to be performed, the method further comprises repeating (a), (b) and (c).

5. The manufacturing method of claim 1, wherein the silicon has a particle diameter of 1 μm or less.

6. The manufacturing method of claim 2, wherein the silicon has a particle diameter of 1 μm or less.

7. The manufacturing method of claim 1, wherein the aluminum member is any one of a chamber, a placing table on which a substrate is placed, an upper electrode, a baffle plate and a shield in the substrate processing apparatus.

8. The manufacturing method of claim 2, wherein the aluminum member is any one of a chamber, a placing table on which a substrate is placed, an upper electrode, a baffle plate and a shield in the substrate processing apparatus.

9. The manufacturing method of claim 1, wherein, in (e), an oxide film of alumina is formed on a surface of the aluminum member by the anodic oxidation.

10. The manufacturing method of claim 1, further comprising, before step (e), performing a stress relief heat treatment process to the aluminum member.

* * * * *